Figure 1:
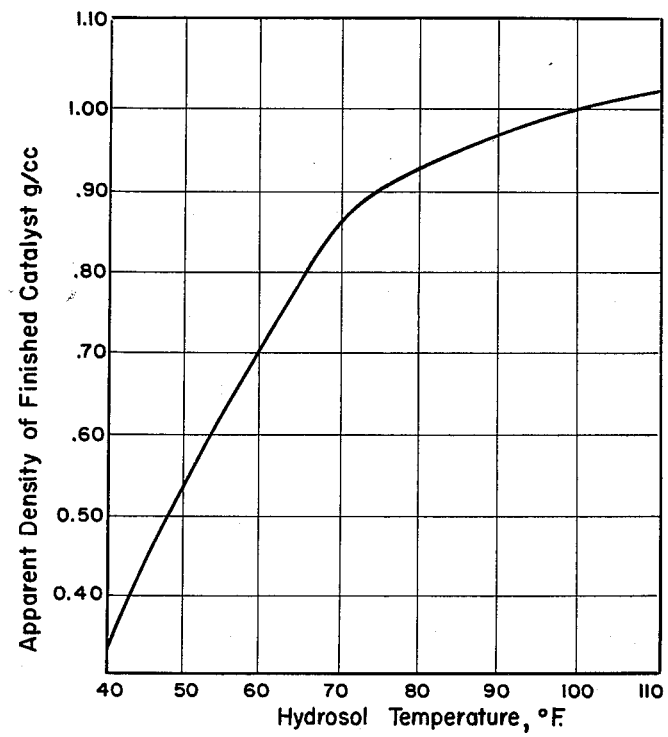

July 6, 1965

R. H. CRAMER ETAL 3,193,511
HIGH STABILITY SILICA-ALUMINA CATALYST AND
METHOD OF PREPARATION THEREOF

Filed July 20, 1960

3 Sheets-Sheet 1

INVENTORS
Robert H. Cramer
Abbott F. Houser
Albert B. Schwartz
Robert C. Wilson, Jr.

BY Raymond W. Barclay
ATTORNEY.

July 6, 1965

R. H. CRAMER ETAL 3,193,511

HIGH STABILITY SILICA-ALUMINA CATALYST AND
METHOD OF PREPARATION THEREOF

Filed July 20, 1960

3 Sheets-Sheet 3

INVENTORS
Robert H. Cramer
Abbott F. Houser
Albert B. Schwartz
Robert C. Wilson, Jr.
BY Raymond W. Barclay
ATTORNEY 3,193,511
HIGH STABILITY SILICA-ALUMINA CATALYST
AND METHOD OF PREPARATION THEREOF
Robert H. Cramer, Woodbury, and Abbott F. Houser, Merchantville, N.J., Albert B. Schwartz, Philadelphia, Pa., and Robert C. Wilson, Jr., Woodbury, N.J., assignors to Socony Mobil Oil Company, Inc., a corporation of New York
Filed July 20, 1960, Ser. No. 44,061
The portion of the term of the patent subsequent to Sept. 6, 1977, has been disclaimed
7 Claims. (Cl. 252—453)

This invention relates to the catalytic conversion of hydrocarbon oils into lower boiling normally liquid and normally gaseous products and to an improved catalyst for effecting said conversion. More specifically, the invention relates to the catalytic cracking of hydrocarbon oils in the presence of a new and improved catalyst. In one embodiment, the invention is concerned with an improved silica-alumina cracking catalyst characterized by an unusually effective combination of physical attributes; specifically, by a high resistance to attrition, high stability to deactivation by steam, high density and high diffusivity. In another embodiment, the invention is directed to an improved method for preparing silica-alumina composites possessing such characteristics useful in catalytic cracking of heavy petroleum fractions to lighter materials boiling in the gasoline range.

As is well known, there are numerous materials, both of natural and synthetic origin, which have the ability to catalyze the cracking of hydrocarbons. However, the mere ability to catalyze cracking is far from sufficient to afford a catalyst of commercial significance. Of the presently commercially available cracking catalysts, a synthetic silica-alumina composite catalyst is by far the most widely used. While such type catalyst is superior in many ways to the earlier employed clay catalysts and is fairly satisfactory, it is generally lacking in one or more of the physical attributes desired in a present-day cracking catalyst.

Thus, modern catalytic cracking processes require a catalyst which is not only specifically active in the chemical reactions which are to be catalyzed but also possesses physical characteristics required for commercially successful operation. One of the outstanding physical attributes of a commercial catalyst is hardness, i.e., the ability to resist attrition. The ability of a particle to hold its shape in withstanding the mechanical handling to which it is subjected upon storage, shipment, and use is a primary requirement for a successful cracking catalyst and for modern catalytic processes utilizing such catalyst. Thus, catalytic cracking operations in which heavy petroleum fractions are converted to lighter materials boiling in the range of gasoline are carried out in the presence of a solid porous catalyst and generally a composite of silica-alumina which may contain a minor proportion of one or more added metals or metal oxides. These catalytic processes are generally advantageously carried out employing methods wherein the catalyst or contact mass is subjected to continuous handling. In such operations, a continuously moving stream of hydrocarbon feed is contacted with a continuously moving stream of catalyst for the accomplishment of conversion and thereafter the catalytic material is continuously regenerated and returned to the conversion zone. This continuous handling and regeneration of the catalyst particles results in considerable breakage and constant abrasion, thus giving rise to an excessive amount of fines which are a loss since they generally cannot be re-used in the same catalytic equipment. Furthermore, there is a tendency for the catalyst fines suspended in the gas or vapor present to act as an abrasive in a manner analogous to sand blasting. This not only wears away the equipment but also causes the catalyst to take up foreign matter detrimental to its catalytic properties. A hard, porous cracking catalyst having the ability to withstand abrasion during the necessary handling involved during continual conversion and regeneration, is definitely desirable in overcoming the aforementioned disadvantages.

Another important physical property desirable in a cracking catalyst is steam stability, i.e. the ability not to become deactivated in the presence of steam at an excessively high rate. During the cracking operation, heavy carbonaceous materials commonly referred to as coke, deposit on the catalyst and prevent contact between the catalytic surface and the hydrocarbon charge. As a result of coke formation, it is necessary to regenerate the catalyst at frequent intervals, first by stripping out entrained oil by contacting with stream and then burning off the carbonaceous deposits by contacting with an oxygen-containing gas, such as air, at elevated temperatures. However, it has been found that the cracking activity of the catalyst deteriorates upon repeated use and regeneration and that silica-alumina catalysts are very sensitive to steaming. Since steaming has been found to be the most effective way of removing entrained oil from the spent catalyst prior to thermal regeneration with air, and since steam is encountered in the seals and kiln of a commercial catalytic cracking unit, it is apparent that a catalyst characterized by good steam stability is definitely to be desired.

Still another important physical attribute of a modern-day cracking catalyst is its diffusivity. The diffusivity of a catalyst is a measured property which characterizes the ability of fluids to diffuse therethrough. A high catalyst diffusivity permits more rapid diffusion of hydrocarbon vapors and other gases throughout the catalyst structure, thereby making possible the use of higher space velocities of hydrocarbons and requiring less time for regeneration of the catalysts when they have become fouled with carbonaceous materials. In present commercial cracking units, carbon burning capacity of the regenerator is the primary limiting factor on conversion capacity for the unit and on conversion level per pass. It is accordingly highly desirable to increase carbon burning capacity by improving the carbon burning rate for the spent catalysts.

It is also desirable in commercial catalytic cracking units to employ a solid porous catalyst of high density. Increasing the density of such catalysts results in increased seal-leg, vapor disengaging and carbon burning capacity in moving bed catalytic cracking units. Increasing catalyst density will, therefore, permit greater hydrocarbon throughput and catalyst circulation rates in existing units or, alternatively, afford handling of the same capacity in smaller cracking units.

The above specified characteristics of the catalyst described herein are achieved by specific control and adjustment of the various interdependent factors involved in production of the catalyst. In one embodiment, the present invention comprises a method for manufacturing an attrition resistant catalyst consisting essentially of silica and alumina, highly stable to deactivation by steam, characterized by a high diffusivity and an apparent density of at least 0.85 g./cc. by dispersing in a silica-alumina sol containing, on a dry basis, a major proportion of silica and having an alumina content in excess of 15 but below 40 percent by weight, prepared by intimately contacting an aqueous solution of an alkali metal aluminate and an aqueous alkali metal silicate solution, an amount corresponding to between about 15 and about 55 percent by weight of the resulting dry composite of finely divided alpha alumina which has undergone previous calcination at a temperature in excess of 2000° F. and which has a weight mean particle diameter of between about 2 and about 7 microns, the concentrations and proportions of reactants being such that the resulting silica-alumina sol having the finely divided calcined alpha alumina dispersed therein has a pH of between about 11 and about 14 and a product concentration within the approximate range of 5 to 11, permitting the resulting sol to set to a hydrogel, aging the hydrogel so obtained in an aqueous solution characterized by a controlled pH within the range of 4 to 10 for 1 to 24 hours, base-exchanging zeolitic alkali metal from the aged hydrogel, and thereafter washing the hydrogel free of water-soluble matter, drying and calcining.

Another and preferred embodiment of the invention affords a method for manufacturing a catalyst consisting essentially of silica and alumina, highly stable to deactivation by steam, characterized by high resistance to attrition, high diffusivity and an apparent density of at least 0.90 gram/cc. by preparing a silica-alumina sol at a temperature between about 50° F. and about 125° F. by intimately contacting an aqueous solution of an alkali metal aluminate, an aqueous alkali metal silicate and an aqueous slurry of calcined alpha alumina powder having a weight mean particle diameter of between about 2 and about 7 microns present in an amount corresponding to between about 35 and about 45 percent by weight of the resulting dry composite under conditions such that the resulting silica-alumina hydrosol, having the powdered calcined alpha alumina dispersed therein has a pH of between 12 and 13, a product concentration of between about 8 and about 10 and in which the content of alumina combined with silica in the silica-alumina hydrosol is within the approximate range of 18 to 30 percent by weight, permitting the resulting hydrosol to set to a hydrogel, aging the hydrogel so obtained in an aqueous solution characterized by a controlled pH within the range of 5 to 9 for 4 to 24 hours, base-exchanging zeolitic alkali metal from the aged hydrogel, washing the hydrogel free of water-soluble matter, drying and calcining.

In still another embodiment, the present invention provides a synthetic cracking catalyst produced in accordance with the foregoing method and consisting essentially of silica and alumina characterized by an apparent density of at least 0.85 and, preferably, at least 0.9 gram per cubic centimeter and having 15 to 55 and preferably 35 to 45 percent by weight of powdered calcined alpha alumina of a weight mean particle diameter of 2 to 7 microns interdispersed in the structure of a silica-alumina cogel, in which the content of cogelled alumina is in excess of 15 but below 40 and preferably between about 18 and about 30 percent by weight.

A still further embodiment of the invention resides in a process for catalytic cracking of hydrocarbon oils in the presence of the above catalyst in accordance with which an enhanced conversion of the charge stock to useful products is realized.

The finely divided calcined alpha alumina employed as one of the reactants herein is composed of alpha alumina which has undergone calcination at a temperature in excess of 2000° F. such that the surface area normally present at low temperature is largely destroyed. Alcoa A-2 Alumina has been found to be a particularly effective form of alumina fulfilling the above requirements. A-2 Alumina is characterized by a hexagonal crystalline structure and has the following properties:

Chemical analysis: Percent
$Al_2O_3$ --- 99
$Na_2O$ --- 0.50
$Fe_2O_3$ --- 0.04
$SiO_2$ --- 0.025
Loss on ignition 1100° C. --- 0.30
Water adsorbed at 50% humidity --- 0.10
Alpha alumina content --- 90+

Physical properties:
Bulk density, packed, lb./ft.$^3$ --- 68
Bulk density, loose, lb./ft.$^3$ --- 52
Specific gravity --- 3.7-3.9
Surface area, m.$^2$/g. --- 0.4
Pore volume, ml./g. --- 0.25
Pore diameter, A. --- 15,000

It is essential in order to achieve the desired characteristics of high density, high diffusivity, and high resistance to attrition that the particle size of the calcined alpha alumina incorporated in the silica-alumina sol be within the approximate range of 2 to 7 microns in weight mean particle diameter. It is further essential in achieveing the above-desired catalyst characteristics that the amount of finely divided alpha alumina incorporated into the silica-alumina sol be within the approximate range of 15 to 55 and, particularly, between about 35 and about 45 percent by weight.

It is contemplated that in place of or in addition to the calcined alumina powder above described, there may be employed other heavy finely divided materials of comparable particle size and amount but not necessarily with equivalent results. Such materials include, for example, barytes, zircon and the like.

The alkali metal aluminate solution employed as another of the reactants herein may be a sodium, potassium or other alkali metal aluminate. Generally, sodium aluminate, due to its lower cost, will be used. The alkali metal silicate reactant employed in the preparation of the present catalyst is generally sodium silicate but other alkali metal silicates such as potassium silicate may, likewise, be used. The alkali metal oxide to silica weight ratio may vary; for example, in sodium silicate the $Na_2O/SiO_2$ ratio is generally between about 0.25 and about 1.5. The concentration of alkali metal silicate solutions employed in the present process is generally such that the silica content thereof is between about 5 and about 30 percent by weight.

In accordance with the present invention, a silica-alumina hydrosol is prepared containing between about 15 and about 55 percent by weight based on the ultimately dried catalyst of a powdered alpha alumina which has undergone previous calcination at a temperature in excess of 2000° F. and which has a weight mean particle diameter of between about 2 and about 7 microns. It has been found that the above particle size is an essential factor in imparting the desired attrition resistance to the prepared catalyst. The powdered material may be added by dispersing in an already prepared hydrosol or as is preferable, where the hydrosol is characterized by a short time of gelation, the powder may be added to one or more of the reactants used in forming the hydrosol or may be admixed in the form of a separate stream with streams of the hydrosol forming reactants in a mixing nozzle or other means where the reactants are brought into intimate contact.

The particle size distribution of the highly calcined alpha alumina introduced into the silica-alumina hydrosol in accordance with the present process was determined by sedimentation methods. The weight mean particle diameters were determined by plotting the cumulative percent of alpha alumina smaller than a given diameter against particle diameter, dividing the total size range into a number of small fractions and calculating as follows:

$$\text{weight mean diameter} = \frac{\sum d_i g_i}{\sum g_i}$$

wherein $d_i$ is the mean particle size of the fraction in microns and $g_i$ is the corresponding weight percent material in the fraction.

In addition to having the above-noted particle size, the calcined alpha alumina incorporated in the hydrosol should necessarily be insoluble therein and should further be characterized by being infusible at the hydrogel drying temperature and at the temperature of calcination. The form of hydrogel is necessarily maintained substantially constant from a time prior to gelation until after the gel has been dried. During drying, the hydrogel undergoes considerable shrinkage. The drying is carried to a stage beyond that at which maximum shrinkage of the gel is obtained. The gel, after syneresis or shrinkage thereof has been completed, is substantially dry, that is, the gel possesses open pores free of liquid although it still contains a relatively small percentage of water which is evolved upon subjecting the gel to a relatively high temperature. Hydrogel containing calcined alumina powder dispersed therein prepared as in the present process may be dried at room temperatures or at higher temperatures in air or steam as well as in various inert or reducing atmospheres. While the prepared hydrogel may be dried at ambient temperature by merely exposing to the air, it is preferred to accelerate the removal of liquid content from the hydrogel by drying at a temperature in the range of about 150° F. to about 400° F. until shrinkage of the hydrogel is substantially complete. Drying may be carried out in air or superheated steam. To impart maximum attrition resistance to the gel, it is further preferred to subject the dried gel to calcination in an inert gas, air, steam, or mixtures thereof at a temperature below that at which sintering is encountered and, generally, in the approximate range of 1150° F. to 1400° F. for a period of about 1 hour or more, generally from about 1 hour to about 24 hours. It is to be understood that the present process is applicable in imparting hardness characteristics to gels which have been dried to the point of maximum shrinkage and which may thereafter undergo the described further drying and/or calcining treatment. In every instance, at a comparable stage of drying or thermal treatment, the gel containing the powdered calcined alumina described herein was harder than a gel containing such alumina material of larger particle size or gel prepared in the absence of added alumina material. Thus, the improvement in resistance to attrition is obtained both in the case of gels which had been merely dried and in the case of gels which had undergone calcination. The latter gels, however, exhibited optimum hardness and it is accordingly preferred to subject the gels prepared as described herein to a final calcination treatment.

The powder incorporated in the sol in accordance with the present invention, as previously noted is a highly calcined form of alpha alumina. The particular form of alumina employed is critical in achieving the desired catalyst characteristics of high density, high diffusivity, and resistance to attrition. It is essential that the powdered calcined alumina have a weight mean particle diameter in the range of 2 to 7 microns; that it be insoluble in the sol, i.e. that it maintain its powdered status upon dispersion in the sol and that it be infusible at the temperature of drying the hydrogel and at the temperature of calcination. The reason for the unusual hardness characteristics of the present gel catalyst is not known with certainty. It would appear, however, that some cementation or hardening takes place during the setting and/or drying of the hydrogel containing the specified highly calcined alumina.

The pH of the hydrosol containing finely divided dispersed calcined alpha alumina is essentially within the range of 11 to 14. The temperature at which the hydrosol is formed has unexpectedly been found to have a marked affect on the apparent density of the finished catalyst. This unexpected result is even more unusual in that an increase in hydrosol temperature was found to result in an increase in the density of the finished catalyst. The relationship between density of the finished catalyst and hydrosol temperature for a typical catalyst containing 20 to 30 percent by weight of calcined alpha alumina powder and having a cogelled alumina content within the range of 20 to 30 percent by weight is shown in FIGURE 1 of the attached drawing. Referring to such figure, it will be seen that to achieve a finished catalyst having an apparent density of at least 0.85 and preferably at least 0.90 gram/cc., the hydrosol temperature should essentially be maintained at a temperature of at least about 70° F. and preferably in the range of 75° F. to 125° F.

Figure 2:
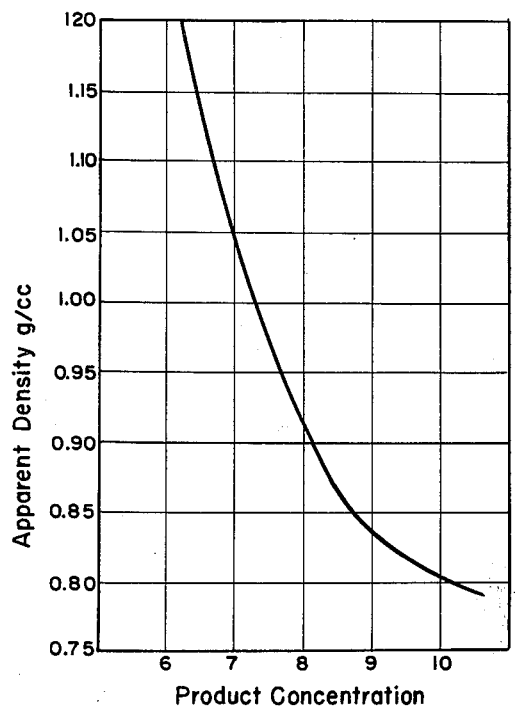

The product concentration (PC) of the hydrosol containing finely divided dispersed calcined alpha alumina obtained in accordance with the process described herein is another variable which must be subjected to close control in order to achieve the benefits of the invention. Product concentration as utilized herein, refers to the total content of product solids present in the freshly formed hydrogel multiplied by 100 and divided by the total solids and water contained in the hydrogel. It is essential to the success of the present process that product concentration (PC) of the hydrosol obtained be within the range of 5 to 11, and preferably between about 8 and about 10. It has been established that product concentration (PC) of the hydrogel has a marked affect on the density of the finished catalyst. The relationship between product concentration and apparent density for catalysts prepared in accordance with the method described herein is shown in FIGURE 2 of the accompanying drawing. Referring more particularly to this figure, it will be seen that in order to achieve a finished catalyst having an apparent density of at least 0.85 and preferably at least 0.90 gram/cc., product concentration should essentially be maintained between 6 and 10 and preferably between about 6 and about 9.

In order that the finished silica-alumina catalyst possess the unusual observed stability to deactivation by steam, it is essential that the cogelled alumina content of the initially formed hydrosol be at least about 15 percent by weight and preferably in the range of 15 to 40 percent by weight. In this regard, it was found that hydrosols having a content of cogelled alumina, as distinguished from the added finely divided calcined alpha alumina, of less than about 15 percent by weight, failed to possess the unusual steam stability exhibited by the catalyst of the invention. It is accordingly essential that the cogelled alumina content of the initially formed hydrosol be at least 15 percent by weight. Since approximately 5 to 8 percent by weight of alumina is ordinarily introduced during the base-exchange step by replacement of zeolitic alkali metal with aluminum, it will be appreciated that the active alumina content, of the finished catalyst, i.e., cogelled alumina plus alumina introduced by base exchange, is at least about 20 percent by weight.

Figure 3:
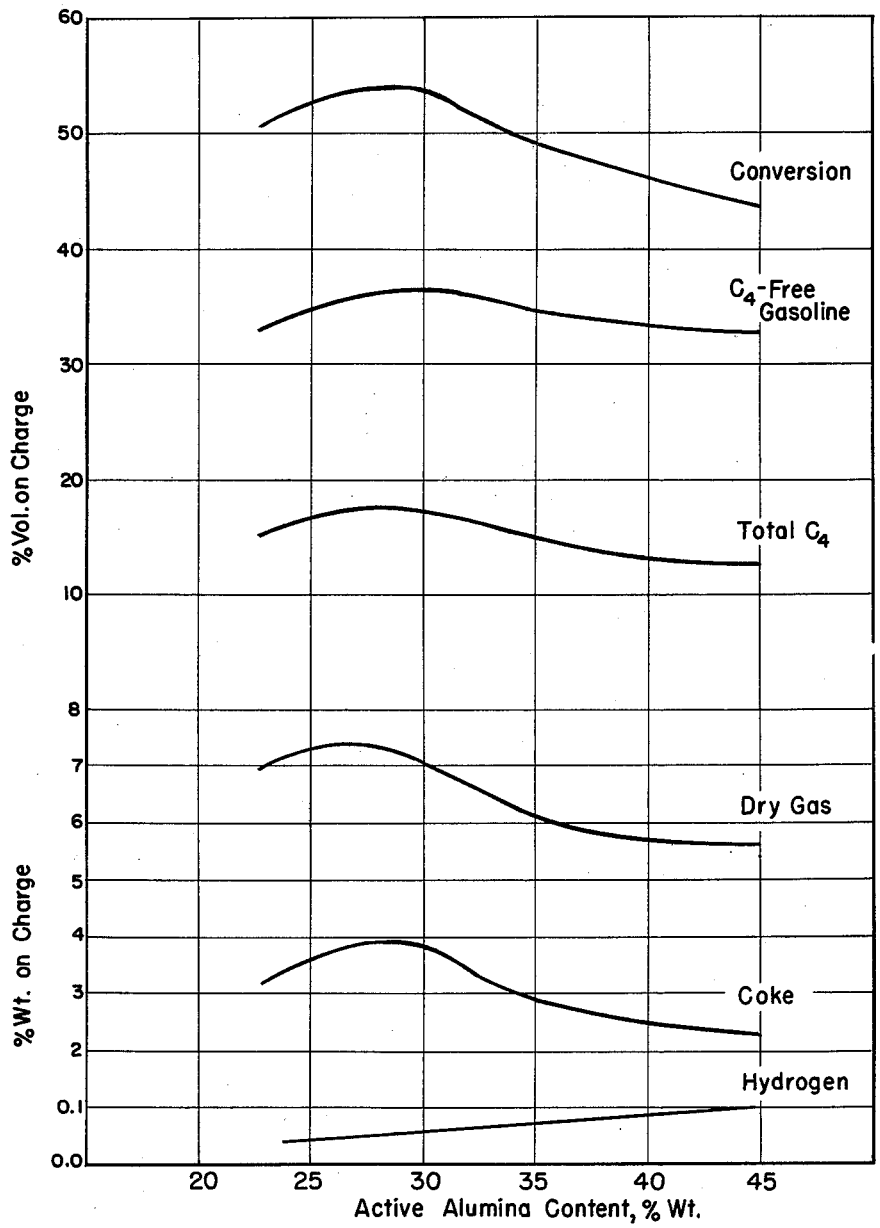

It has been found that the active alumina content of catalysts prepared in accordance with the present process further influences the catalytic cracking characteristics of the finished catalyst. In this regard, it has been established that a catalyst having an active alumina content within the approximate range of 25 to 33 percent by weight, equivalent to about 19 to 27 percent by weight of cogelled alumina on the gel phase, unexpectedly possesses enhanced cracking characteristics as compared with similar silica-alumina catalysts having an active alumina content outside the aforementioned range. The relationship between cracking ability and active alumina content of the catalyst is shown in FIGURE 3 of the attached drawing. In such figure, data obtained upon cracking a Mid-Continent gas oil having a boiling range of 450 to 950° F. to gasoline having an end point of 410° F. by passing vapors of the said gas oil through the catalyst at 875° F., substantially atmospheric pressure and a feed rate of 1.5 volumes of liquid oil per volume of catalyst per hour for ten minute runs between regenerations is plotted against the active alumina content of otherwise identical catalysts prepared in accordance with the invention, containing 40 percent by weight of finely divided calcined alpha alumina and which had undergone a steam treatment for 30 hours at 1200° F. and a pressure of 15 p.s.i.g. prior to testing. Referring to such figure, it will be seen that maximum conversion and gasoline yield was obtained with a catalyst wherein the active alumina content was between about 25 and 33 percent by weight.

Figure 4:
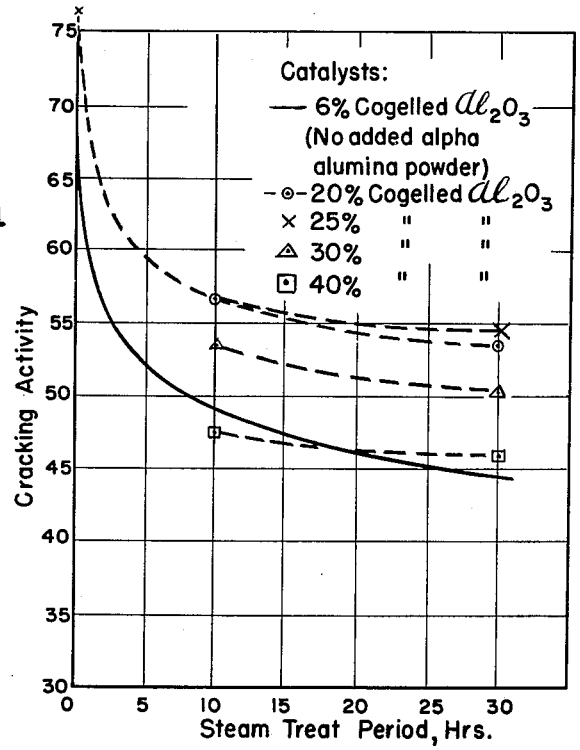

The cogelled alumina content of the present catalyst has further been found to have a marked effect on the steam stability thereof. The relationship between cracking activity, as hereinafter defined, and duration of steam treatment with 100 percent steam at 1200° F. and 15 p.s.i.g. for silica-alumina catalysts prepared as described herein containing 40 percent by weight of finely divided calcined alpha alumina with varying cogelled alumina content and also for a silica-alumina catalyst having a cogelled alumina content of approximately 6 percent cogelled alumina with no added finely divided calcined alpha alumina is shown in FIGURE 4 of the accompanying drawing. It will be seen by reference to such figure that the catalysts with a cogelled alumina content of 20 to 25 percent weight were much more stable than the catalysts with a higher alumina content or the silica-alumina catalyst without added alpha alumina powder having a cogelled alumina content of about 6 percent by weight.

The intermediate hydrogel state obtained in preparation of present catalysts is to be distinguished from a gelatinous precipitate. True all-embracing hydrogels occupy the entire volume of the solution from which they are formed and possess a definitely rigid structure. When fractured, a true hydrogel shows a conchoidal fracture as compared to an irregular ragged edge fracture as obtained in the case of gelatinous precipitates. The latter occupy only a portion of the volume of the solution from which they are formed and have no rigidity of structure. In addition, hydrogels can generally be more easily washed free of soluble impurities due to the tendency of gelatinous precipitates to peptize on washing. A distinct and further advantage of hydrogels is that due to their rigid structure they can be formed into high quality spheroidal particles.

The freshly formed silica-alumina hydrogel having finely divided alpha alumina dispersed therein is subject to a loss of aluminum as sodium aluminate if immediately washed with water. This tends to weaken the hydrogel to such an extent that it disintegrates in the wash water. In accordance with the process of the invention, that adverse effect can be avoided by immediately treating the freshly formed hydrogel in an acidic aqueous medium of controlled pH. This is generally accomplished by bringing the freshly formed hydrogel product into contact with an aqueous solution of a salt or acid capable of affording the requisite equilibrium pH. It has been found in accordance with the present invention that the pH of said aqueous medium is a critical factor affecting the hardness and percentage of whole beads of the resultant cogelled catalyst. It has been found that the pH of the aqueous medium in contact with the hydrogel should be between 4 and 10 and preferably between 5 and 9. In a typical operation, the fresh hydrogel beads are sluiced out of the forming tower with oil. The hydrogel beads are then separated from the oil and treated with an aqueous solution of an ammonium salt such as ammonium sulfate. The solution is advantageously kept at a pH of 4 to 10 by the addition of sulfuric acid. It has been found advisable to maintain a solution of this type in contact with the freshly formed hydrogel for some time after formation, generally for at least about 4 hours and preferably 8 hours or longer. For example, the solution may be recirculated through the freshly formed hydrogel or otherwise maintained in contact therewith for a period of from about 8 to about 24 hours after forming in order to fix the alumina. Such treatment of the freshly formed hydrogel is designated herein as "aging."

The hydrogel, after aging, is subjected to a base-exchange treatment to remove zeolitic alkali metal introduced into the hydrogel through the use of alkali metal reactants. The hydrogel may be base-exchanged with a suitable aqueous solution containing an ion capable of replacing zeolitic alkali metal which ion does not detrimentally affect the finished catalyst. Thus, the base-exchange solution employed may effect replacement of zeolitic alkali metal without involving the introduction of additional metal or metal compound in the hydrogel such as treatment with a solution of an aluminum salt, an ammonium salt or an acid. By using a base-exchange solution of a metal salt, other than a metal already contained in the hydrogel, it is possible to introduce quantities of an additional metal oxide into the gel composite. The incorporation of such additional metal oxide into the hydrogel may desirably act as a catalytic promoter under particular reaction conditions. Under normal conditions of operation, however, it is contemplated that the base-exchange solution utilized herein will comprise an aqueous aluminum salt solution such as aluminum nitrate, aluminum chloride, aluminum sulfate and the like enabling replacement of the zeolitic alkali metal in the hydrogel with aluminum during the course of the base-exchange operation.

The hydrogel product after base-exchange, is water-washed free of soluble matter. The washed hydrogel is then dried, suitably in an atmosphere of superheated steam, at a temperature of about 150 to about 400° F. The dried product is thereafter calcined suitably in an atmosphere of air and/or steam at a temperature of 1150° F. to 1400° F. to yield a high density, high attrition resistant finished catalyst.

The process described herein may be employed in the preparation of a silica-alumina cracking catalyst in any desired physical form. Thus, the hydrosol containing added alpha alumina powder may be permitted to set in mass to a hydrogel which is thereafter dried and broken into pieces of desired size. The pieces of gel so obtained are generally of irregular shape. Uniformly shaped pieces of gel may be obtained by extrusion or pelleting of the powder-containing hydrogel. Also the hydrosol may be introduced into the perforations of a perforated plate and retained therein until the sol has set to a hydrogel after which the formed hydrogel pieces are removed from the plate. The method of the invention is especially useful as applied to the manufacture of spherically shaped gel particles produced by any feasible process such as that described in patents to Marisic, for example, U.S. 2,384,946. Broadly, such methods involve introducing globules of hydrosol into a column of water-immiscible liquid, for example, an oil medium wherein the globules of hydrosol set to spheroidal bead-like particles of hydrogel. Larger size spheres are ordinarily within the range of from about 1/64 to about 1/2 inch in diameter whereas smaller size spheres which are generally referred to as microspheres are within the range of from about 10 to about 100 microns in diameter. The use of spherically shaped gel particles is of particular advantage in hydrocarbon conversion processes including the moving catalyst bed process, the fluidized process and other processes in which the spheroidal silica-alumina cracking catalyst particles are subjected to continuous movement. As applied to the stationary bed, spheroidal gel catalyst particles provide effective contact between the reactants and the catalyst by avoiding channeling.

It is accordingly a preferred embodiment of the present invention to prepare the described high stability attrition-resistant silica-alumina catalyst in the form of spheres although it is to be realized that the method hereinafter set forth may also be employed in obtaining a mass of gel which may thereafter be broken up into particles of desired size. Likewise, the method described herein may be used in the preparation of silica-alumina cracking catalysts in the form of particles of any other desired size or shape.

Steam stability of the catalyst prepared in accordance with the method described herein was determined by an accelerated test which simulates the conditions encountered during catalyst use. In this test, the catalyst is contacted with 100 percent steam at 1200° F. and 15 p.s.i.g. pressure for periods of time up to about 30 hours and the cracking activity is then determined and compared with the cracking activity of conventional catalysts steam treated in the same manner. The results thus obtained are indicative of the stability of the catalyst of the present invention.

The cracking activity of the catalyst is a measure of its capacity to catalyze conversion of hydrocarbons and is expressed herein as the percentage conversion of a Mid-Continent gas oil having a boiling range of 450 to 950° F. to gasoline having an end point of 410° F. by passing vapors of the said gas oil through the catalyst at 875° F., substantially atmospheric pressure and a feed rate of 1.5 volumes of liquid oil per volume of catalyst per hour for ten minute runs between regenerations. The catalyst described herein is desirably characterized by a conversion, at equilibrium, determined on the above basis within the approximate range of 50 to 60.

The diffusivity of the catalyst is a measure of the ability of fluids to diffuse therethrough and is determined by measuring the rate at which hydrogen under a constant partial pressure, at essentially atmospheric conditions, will pass through a single catalyst particle having a size of 5 to 6 mesh (Tyler). The diffusivity is the average of such determinations on fifteen particles and is expressed as cubic centimeters of hydrogen per centimeter of catalyst per second $\times 10^3$. The catalyst described herein is desirably characterized by a diffusivity determined on the above basis of at least 10 and generally within the range of 15 to 30.

The term "apparent density" as utilized herein refers to the weight as compared with the volume occupied by a packed mass of the catalyst particles. It is determined by weighing a fairly large volume of the catalyst particles. For example, a large diameter graduated cylinder is filled to a volume calibration gently tamped down and the weight of the particles determined by difference in weight of the graduate before and after filling with the particles. The catalyst of the present invention is characterized by an apparent density of at least 0.85 gram per cubic centimeter and generally within the range of 0.9 to 1.10 grams per cubic centimeter.

The attrition characteristics of the catalysts prepared in accordance with the method described herein were determined by an attrition test known as the Lauson Shaker Attrition (LSA) Test. The procedure used in the test consists of shaking a 50 cc. sample of the product to be tested in a closed steel cup which is bolted to the piston of a motor-driven Lauson Engine which operates at 1000 r.p.m. After shaking for a time sufficient to produce 10 weight percent fines, capable of passing through an 8 mesh (Tyler) screen, the sample is screened, weighed and the percentage loss is calculated. These operations are repeated until slightly more than half the sample has been reduced to fines. Cumulative losses are plotted against total shaking time. The cumulative time in seconds for 50 percent weight of fines is read from the curve and is reported as the Lauson Shaker Attrition. Since the LSA of gels is affected by the size of the particles tested, the attrition data reported herein corresponds to that of particles having an average particle diameter of 0.140 inch to avoid the interferences of these variables in correlating the effect of quantity and size of added material on attrition. The catalyst described herein is characterized by a LSA attrition resistance of at least 1000 seconds and generally within the approximate range of 1500 to 3000 seconds.

The following examples will serve to illustrate the present invention without limiting the same:

EXAMPLE 1

Silica-alumina gel was prepared by mixing streams comprising:
(1) Sodium aluminate solution;
(2) Sodium silicate solution;
(3) An aqueous slurry of finely divided calcined alpha alumina.

The sodium aluminate solution was composed of 4.62 percent by weight of $Al_2O_3$, 3.79 percent by weight of $Na_2O$ and 91.59 percent by weight of water and had a specific gravity at 60° F. of 1.088. The sodium silicate stream was composed of 41.5 weight percent of water and 58.5 percent by weight of N-Brand sodium silicate and had a specific gravity at 60° F. of 1.205. The alumina slurry stream was composed of 20 percent by weight of Alcoa A–2 alumina having a weight mean particle diameter of 5.4 microns and 80 percent by weight of water and had a specific gravity at 60° F. of 1.172.

Three-hundred twenty-four (324) cc. per minute of the sodium aluminate solution, 270 cc. per minute of the sodium silicate solution and 104 cc. per minute of the alumina slurry were mixed in a mixing nozzle to form a sol which set to a hydrogel in 3.4 seconds at 70° F. The sol was formed into spheroidal hydrogel beads by introducing globules of the sol into an oil medium. The resulting hydrogel particles having a pH of 11.5 were treated for 4 hours by circulating therethrough an aqueous acidic solution containing 2 percent by weight sodium acetate maintained at 4 to 9 pH by the batchwise addition of 50 grams $H_2SO_4$ every ½ hour to reduce the gel pH to 8.8–9.0. The hydrogel particles were then treated for 8 hours at 85° F. while covered with water and thereafter were base-exchanged with a 1.5 percent by weight aluminum sulfate solution employing 27 two-hour batch treatments to remove sodium from the structure of the gel. The hydrogel was thereafter treated with a 0.1 weight percent solution of ammonium sulfate employing two 1-hour batch treatments. The resulting hydrogel was washed free of soluble salts and then dried in superheated steam at 270–340° F. for ½ hour followed by calcining for 3 hours at 1300° F. in air. The resulting gel, which contained 22.9 percent by weight of added calcined alumina, had a Lauson Shaker Attrition of 3620 seconds. The apparent density of the finished catalyst product was 0.85 g./cc.

The above catalyst having a cogelled alumina content of 21.7 weight percent and an active alumina content of about 28.7 weight percent was steam treated with 100 percent steam at 15 p.s.i.g. at 1200° F. for 5 hours. The steam treated catalyst was tested for catalytic cracking activity by passing thereover a charge of a Mid-Continent gas oil having a boiling range of 450 to 950° F. at a reactor temperature of 875° F., an LHSV of 1.5 at atmospheric pressure. The results obtained are shown below and compared with those obtained upon similar testing of a standard silica-alumina cogel catalyst containing about 10% weight active alumina and wherein no finely divided calcined alumina was introduced into the sol. Comparison was made with the results obtained with standard catalyst after it had undergone the above-indicated steam treatment. Comparative results are shown below:

|  | Catalyst of Ex. 1 | Standard Silica-Alumina Catalyst After Steam Treatment |
|---|---|---|
| $C_4$-free Gaso., percent Vol | 38.0 | 36.3 |
| Total $C_4$, percent Vol | 18.5 | 16.4 |
| Dry Gas, percent Wt | 7.9 | 7.0 |
| Coke, percent Wt | 4.6 | 3.7 |
| Conversion, percent Vol | 57.5 | 53.3 |

It will be seen from the above data that the catalyst prepared as described herein was characterized by improved steam stability.

Figure 5:
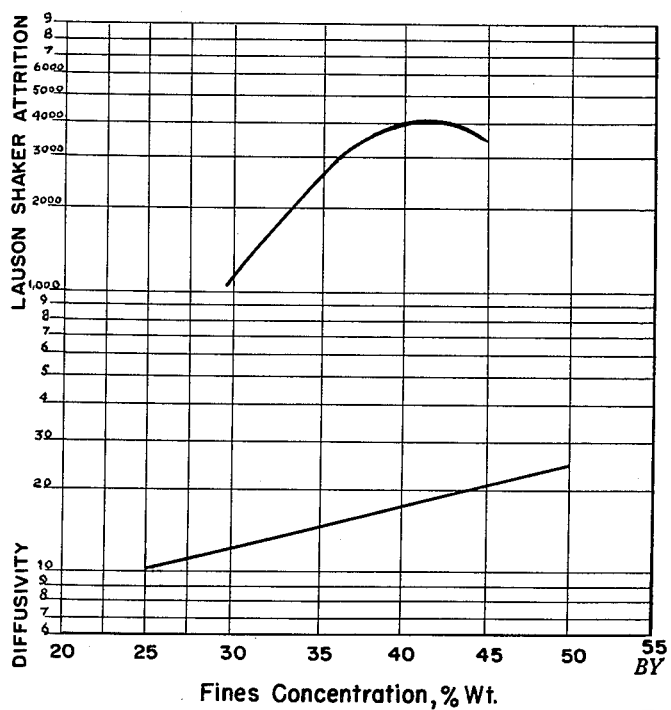

A series of high stability catalysts prepared according to the procedure of Example 1 but containing varying quantities of Alcoa A-2 Alumina having a weight mean particle diameter of 5.4 microns together with a dispersant for such finely divided alumina were produced and tested for diffusivity and for physical durability in the Lauson Shaker Attrition Test. The data obtained in such tests are shown graphically in FIGURE 5 of the attached drawing wherein the diffusivity and the LSA Test results showing the time in seconds required to produce 50 weight percent of fines are plotted against the weight percent concentration of A-2 alumina powder. It will be seen from the data of FIGURE 5 that as the content of A-2 Alumina powder was increased over the range of 25 to 45 percent by weight, the diffusivity of the catalyst increased. The attrition resistance of the catalyst increased as the concentration of A-2 Alumina powder was increased over the range of approximately 30 to 40 percent by weight and thereafter decreased with an increasing concentration of such powder. In accordance with the present invention, in order to obtain a catalyst characterized by a high diffusivity and high attrition resistance, it is preferred to maintain the concentration of added finely divided alumina within the range of 15 to 55 and preferably between about 35 and about 45 percent by weight. It will be appreciated that the particular amount of added alumina within the aforementioned range will be dependent upon its particle size as well as on the other factors and conditions involved in preparation of the catalyst. Thus, with the use of finely divided alumina characterized by a weight mean particle diameter of about 5.4 microns, the concentrations of added finely divided alumina is desirably in the range of about 35 to about 45 and particularly, about 40 percent by weight of the catalyst product.

A series of high stability catalysts were prepared in accordance with the general procedure of Example 1 with variation in the pH and composition of the aging solution employed. The effect of such variables was determined over the range of 5 to 9 pH with various salts and acids. The catalysts undergoing treatment were prepared to contain 20 percent by weight of cogelled alumina and 30 percent by weight of calcined alpha alumina powder. The results obtained utilizing various aging solutions under specified pH conditions are shown in Table I below:

Table I

| Example | Aging Solution | | pH of Aging Solution | | | | | |
|---|---|---|---|---|---|---|---|---|
| | | | 5 pH | | 7 pH | | 9 pH | |
| | Salt Solution | Acid Solution | Whole Beads, Percent Wt. | 50% LSA, sec. | Whole Beads, Percent Wt. | 50% LSA, sec. | Whole Beads, Percent Wt. | 50% LSA, sec. |
| 2 | None—$H_2O$ Only | 50% $H_2SO_4$ | 74 | 170 | 81 | 330 | 88 | 890 |
| 3 | 2% $CH_3COONa$ | 50% $H_2SO_4$ | 94 | 1,740 | 89 | 760 | 87 | 1,295 |
| 4 | 2% $CH_3COONa$ | 75% $CH_3COOH$ | 87 | 515 | 82 | 205 | 85 | 275 |
| 5 | 10% $(NH_4)_2SO_4$ | 50% $H_2SO_4$ | 97 | 2,560 | 87 | 1,460 | 86 | 15 |

It will be seen from the above data that the use of an ammonium salt at a pH of 5 was particularly effective in affording a catalyst characterized by a high whole bead yield and a high resistance to attrition.

The results of additional wet processing experiments are shown below in Table II:

Table II

| Example | Thermal Treatment | | | Wet Processing | | Properties of Finished Catalyst | | | Diffusivity, $cm.^2/sec. \times 10^3$ | Na, Percent Wt. |
|---|---|---|---|---|---|---|---|---|---|---|
| | Salt Solution | Time, Hrs. | Temp., °F. | Aging Period, Hrs. | No. of 2-Hr. Base Exc.[1] | Whole Beads, Percent Wt. | 50% LSA, Sec. | Packed Dens, g./cc. | | |
| 6 | 8% $Na_2SO_4$ | 24 | 40 | 8 | 12 | 84 | 3,650 | 0.90 | 9.0 |  |
| 7 |  |  |  | 8 x ½-hr.[2] | 12 | 68 | 1,220 | 0.89 | 9.0 |  |
| 8 |  |  |  | 4 x +1-hr. 8[3] | 12 | 93 | 3,760 | 0.86 | 8.9 | 0.06 |

[1] With 1.5% $Al_2(SO_4)_3$ solution.
[2] Batchwise in 10% $(NH_4)_2SO_4$ adjusted to 5 pH with $H_2SO_4$; no circulation; no pH control.
[3] In circulating water adjusted to 5 pH with $H_2SO_4$; no $(NH_4)_2SO_4$.

It will be seen from the above table and, particularly, from Example 8 that the presence of an ammonium salt in the aging solution is not essential. However, aging without an ammonium salt is more difficult to reproduce. It will be noted from Example 6 that the density of the finished catalyst may be controlled by hydrothermally treating the hydrogel prior to aging. In such treating step, a saturated solution of sodium sulfate was used in thermally treating the hydrogel to prevent loss of alumina prior to the aging step.

We claim:

1. A method for preparing an attrition resistant catalyst consisting essentially of silica and alumina, highly stable to deactivation by steam, characterized by a high diffusivity and an apparent density of at least 0.85 g./cc., which comprises dispersing in a silica-alumina sol containing, on a dry basis, a major proportion of silica and having an alumina content in excess of 15 but below 40 percent by weight, prepared by intimately contacting an aqueous solution of an alkali metal aluminate and an aqueous alkali metal silicate solution, an amount corresponding to between about 15 and about 55 percent by weight of the resulting dry composite of finely divided alpha alumina which has undergone previous calcination at a temperature in excess of 2000° F. and which has a weight mean particle diameter of between about 2 and about 7 microns, the concentrations and proportions of reactants being such that the resulting silica-alumina sol having the finely divided calcined alpha alumina dispersed therein has a pH between 11 and 14 and a product concentration within the approximate range of 5 to 11, permitting the resulting sol to set to a hydrogel, aging the hydrogel so obtained in an aqueous solution characterized by a controlled pH within the range of 4 to 10 for 1 to 24 hours, base exchanging zeolitic alkali metal from the aged hydrogel, washing the hydrogel free of water-soluble matter, drying and calcining.

2. A method for preparing an attrition resistant catalyst consisting essentially of silica and alumina, highly stable to deactivation by steam, characterized by a high diffusivity and an apparent density of 0.85 g./cc. which comprises intimately contacting an aqueous solution of an alkali metal aluminate, an aqueous solution of an alkali metal silicate and an aqueous slurry of calcined alpha alumina powder having a weight mean particle diameter of between about 2 and about 7 microns present in an amount corresponding to between about 20 and about 55 percent by weight from the resulting dry composite, under conditions such that the resulting silica-alumina hydrosol, having the powdered calcined alpha alumina dispersed therein has a pH of between 11 and 14, a product concentration of between about 5 and about 11 and in which the content of alumina combined with silica in the silica-alumina hydrosol is in excess of 15 but below 40 percent by weight, permitting the resulting hydrosol to set to a hydrogel, aging the hydrogel so obtained in an aqueous solution characterized by a controlled pH within the range of 4 to 10 for 4 to 24 hours, base-exchanging zeolitic alkali metal from the aged hydrogel, washing the hydrogel free of water-soluble matter, drying and calcining.

3. A method for preparing a catalyst consisting essentially of silica and alumina, highly stable to deactivation by steam, characterized by high resistance to attrition, high diffusivity and an apparent density of at least 0.90 g./cc. which comprises preparing a silica-alumina sol at a temperature between about 50° F. and about 125° F. by intimately contacting an aqueous solution of an alkali metal aluminate, an aqueous solution of an alkali metal silicate and an aqueous slurry of calcined alpha alumina powder having a weight mean particle diameter of between about 2 and about 7 microns present in an amount corresponding to between about 35 and about 45 percent by weight of the resulting dry composite under conditions such that the resulting silica-alumina hydrosol having the powdered calcined alpha alumina dispersed therein has a pH of between 12 and 13, a product concentration of between about 8 and about 10 and in which the content of alumina combined with silica in the silica-alumina hydrosol is within the approximate range of 18 to 30 percent by weight, permitting the resulting hydrosol to set to a hydrogel, aging the hydrogel so obtained in an aqueous solution characterized by a controlled pH within the range of 5 to 9 for 4 to 24 hours, base-exchanging zeolitic alkali metal from the aged hydrogel, washing the hydrogel free of water-soluble matter, drying and calcining.

4. A method for preparing spheroidal particles of an attrition resistant catalyst consisting essentially of silica and alumina, highly stable to deactivation by steam characterized by a high diffusivity and an apparent density of at least 0.85 g./cc., which comprises dispersing in a silica-alumina sol containing, on a dry basis, a major proportion of silica and an alumina content in excess of 15 but below 40 percent by weight, prepared by intimately contacting an aqueous solution of an alkali metal aluminate and an aqueous solution of an alkali metal silicate, an amount corresponding to between about 15 and about 55 percent by weight of the resulting dry composite of finely divided alpha alumina which has undergone previous calcination at a temperature in excess of 2000° F. and which has a weight mean particle diameter of between about 2 and about 7 microns, the concentrations and proportions of reactants being such that the resulting silica-alumina sol having the finely divided calcined alpha alumina dispersed therein has a pH of within 11 and 14, and a product concentration within the approximate range of 5 to 11, introducing globules of the resulting hydrosol into a column of water-immiscible liquid wherein the globules of hydrosol set to spheroidal hydrogel, effecting gelation of said spheroidal hydrosol particles, aging the resulting hydrogel particles in an aqueous solution characterized by a controlled pH within the range of 4 to 10 for 1 to 24 hours, base-exchanging zeolitic alkali metal from the aged hydrogel particles, washing the spheroidal hydrogel particles free of water-soluble matter and drying and calcining.

5. An attrition resistant catalyst composition consisting essentially of silica and alumina highly stable to deactivation by steam, characterized by a high diffusivity and an apparent density of at least 0.85 g./cc. prepared by dispersing in a silica-alumina sol containing, on a dry basis, a major proportion of silica and having an alumina content in excess of 15 but below 40 percent by weight, prepared by intimately contacting an aqueous solution of an alkali metal aluminate and an aqueous alkali metal silicate solution, an amount corresponding to between about 15 and about 55 percent by weight of the resulting dry composite of finely divided alpha alumina which has undergone previous calcination at a temperature in excess of 2000° F. and which has a weight mean particle diameter of between about 2 and about 7 microns, the concentrations and proportions of reactants being such that the resulting silica-alumina sol having the finely divided calcined alpha alumina dispersed therein has a pH between 11 and 14 and a product concentration within the approximate range of 5 to 11, permitting the resulting sol to set to a hydrogel, aging the hydrogel so obtained in an aqueous solution characterized by a controlled pH within the range of 4 to 10 for 1 to 24 hours, base-exchanging zeolitic alkali metal from the aged hydrogel, washing the hydrogel free of water-soluble matter, drying and calcining.

6. An attrition resistant catalyst composition in the form of spheroids consisting essentially of silica and alumina highly stable to deactivation by steam, characterized by a high diffusivity and an apparent density of at least 0.85 g./cc. prepared by dispersing in a silica-alumina sol containing, on a dry basis, a major proportion of silica and an alumina content in excess of 15 but below 40 percent by weight, prepared by intimately contacting an aqueous solution of an alkali metal aluminate and an aqueous solution of an alkali metal silicate an amount corresponding to between about 15 and about 55 percent by weight of the resulting dry composite of finely divided alpha alumina which has undergone previous calcination at a temperature in excess of 2000° F. and which has a weight mean particle diameter of between about 2 and about 7 microns, the concentrations and proportions of reactants being such that the resulting silica-alumina sol having the finely divided calcined alpha alumina dispersed therein has a pH of within 11 and 14 and a product concentration within the approximate range of 5 to 11, introducing globules of the resulting hydrosol into a column of water-immiscible liquid wherein the globules of hydrosol set to spheroidal hydrogel, effecting gelation of said spheroidal hydrosol particles, aging the resulting hydrogel particles in an aqueous solution characterized by a controlled pH within the range of 4 to 10 for 1 to 24 hours, base-exchanging zeolitic alkali metal from the aged hydrogel particles, washing the spheroidal hydrogel particles free of water-soluble matter and drying and calcining.

7. An attrition resistant catalyst composition consisting essentially of silica and alumina highly stable to deactivation by steam, characterized by a high diffusivity and an apparent density of at least 0.9 g./cc. produced by preparing a silica-alumina sol at a temperature between about 50° F. and 125° F. by intimately contacting an aqueous solution of an alkali metal aluminate, an aqueous solution of an alkali metal silicate and an aqueous slurry of calcined alpha alumina powder having a weight mean particle diameter of between about 2 and about 7 microns present in an amount corresponding to between about 35 and about 45 percent by weight of the resulting dry composite under conditions such that the resulting silica-alumina hydrosol having the powdered calcined alpha alumina dispersed therein has a pH of between 12 and 13, a product concentration of between about 8 and about 10 and in which the content of alumina combined with silica in the silica-alumina hydrosol is within the approximate range of 18 to 30 percent by weight, permitting the resulting hydrosol to set to a hydrogel, aging the hydrogel so obtained in an aqueous solution characterized by a controlled pH within the range of 5 to 9 for 4 to 24 hours, base-exchanging zeolitic alkali metal from the aged hydrogel, washing the hydrogel free of water-soluble matter, drying and calcining.

References Cited by the Examiner
UNITED STATES PATENTS

| | | | |
|---|---|---|---|
| 2,487,065 | 11/49 | Milliken | 252—455 |
| 2,669,547 | 2/54 | Shabaker | 252—448 |
| 2,951,815 | 9/60 | Cramer et al. | 252—453 |
| 2,988,520 | 6/61 | Braithwaite | 252—455 |
| 3,010,914 | 11/61 | Braithwaite et al. | 252—455 |
| 3,025,246 | 3/62 | Reid | 252—455 |

MAURICE A. BRINDISI, *Primary Examiner.*
JULIUS GREENWALD, *Examiner.*

Disclaimer 3,193,511.—*Robert H. Cramer*, Woodbury, *Abbott F. Houser*, Merchantville, N.J., *Albert B. Schwartz*, Philadelphia, Pa., and *Robert C. Wilson, Jr.*, Woodbury, N.J. HIGH STABILITY SILICA-ALUMINA CATALYST AND METHOD OF PREPARATION THEREOF. Patent dated July 6, 1965. Disclaimer filed Nov. 20, 1968, by the assignee, *Mobil Oil Corporation*.

Hereby disclaims the terminal portion of the term of the patent subsequent to Sept. 6, 1977.

[*Official Gazette April 1, 1969.*]